(12) United States Patent
Nolcheff

(10) Patent No.: US 7,984,614 B2
(45) Date of Patent: Jul. 26, 2011

(54) PLASMA FLOW CONTROLLED DIFFUSER SYSTEM

(75) Inventor: Nick Nolcheff, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 477 days.

(21) Appl. No.: 12/272,511

(22) Filed: Nov. 17, 2008

(65) Prior Publication Data

US 2010/0122536 A1    May 20, 2010

(51) Int. Cl.
*F02C 1/00* (2006.01)
(52) U.S. Cl. ............................................. 60/751; 60/726
(58) Field of Classification Search .................... 60/726, 60/751; 415/191, 193, 194, 211.2; 313/359.1, 313/362.1
See application file for complete search history.

(56) References Cited

U.S. PATENT DOCUMENTS

| | | | |
|---|---|---|---|
| 3,167,109 A | 1/1965 | Wobig | |
| 6,247,671 B1 | 6/2001 | Saeks et al. | |
| 6,796,532 B2 | 9/2004 | Malmuth et al. | |
| 7,070,144 B1 | 7/2006 | DiCocco et al. | |
| 7,183,515 B2 | 2/2007 | Miller et al. | |
| 7,334,394 B2 | 2/2008 | Samimy et al. | |
| 7,380,756 B1 | 6/2008 | Enloe et al. | |
| 7,628,585 B2 | 12/2009 | Lee et al. | |
| 7,870,719 B2 * | 1/2011 | Lee et al. ......................... | 60/202 |
| 7,870,720 B2 * | 1/2011 | Hagseth et al. ................. | 60/204 |
| 2006/0091731 A1* | 5/2006 | Haje et al. ....................... | 310/11 |
| 2007/0126292 A1 | 6/2007 | Lugg | |
| 2007/0183890 A1 | 8/2007 | Nolcheff et al. | |
| 2008/0089775 A1 | 4/2008 | Lee et al. | |
| 2008/0101913 A1 | 5/2008 | Lee et al. | |
| 2008/0115477 A1 | 5/2008 | Samimy et al. | |
| 2008/0128266 A1 | 6/2008 | Lee et al. | |
| 2008/0131265 A1 | 6/2008 | Lee et al. | |
| 2008/0145210 A1 | 6/2008 | Lee et al. | |
| 2008/0145233 A1 | 6/2008 | Lee et al. | |
| 2009/0065064 A1 | 3/2009 | Morris et al. | |
| 2009/0169356 A1 | 7/2009 | Wadia et al. | |
| 2009/0169362 A1 | 7/2009 | Wadia et al. | |
| 2009/0169363 A1 | 7/2009 | Wadia et al. | |
| 2009/0169367 A1 | 7/2009 | Wadia et al. | |
| 2009/0293485 A1 | 12/2009 | Nolcheff et al. | |

FOREIGN PATENT DOCUMENTS

DE    202007010648 U1    12/2007
EP    1980790 A2    10/2008

OTHER PUBLICATIONS

EP Search Report, EP09175728.6 dated Mar. 24, 2010.

* cited by examiner

*Primary Examiner* — Michael Cuff
*Assistant Examiner* — Phutthiwat Wongwian
(74) *Attorney, Agent, or Firm* — Ingrassia Fisher & Lorenz, P.C.

(57) ABSTRACT

A diffuser system for a compressor for a gas turbine engine includes a diffuser and a plasma actuator. The diffuser comprises a first wall and a second wall. The first and second walls form a diffuser flow passage therebetween. The plasma actuator is disposed at least partially proximate the second wall. The plasma actuator is adapted to generate an electric field to ionize a portion of air flowing through the flow passage.

20 Claims, 9 Drawing Sheets

PLASMA FLOW CONTROLLED DIFFUSER SYSTEM

TECHNICAL FIELD

The present invention relates to gas turbine engines, and more particularly relates to diffusers for gas turbine engines.

BACKGROUND

Aircraft main engines not only provide propulsion for the aircraft, but in many instances may also be used to drive various other rotating components such as, for example, generators, compressors, and pumps, to thereby supply electrical, pneumatic, and/or hydraulic power. Generally, a gas turbine engine includes a combustor, a power turbine, and a compressor. During operation of the engine, the compressor draws in ambient air, compresses it, and supplies compressed air to the combustor. The compressor also typically includes a diffuser that diffuses the compressed air before it is supplied to the combustor. The combustor receives fuel from a fuel source and the compressed air from the compressor, and supplies high energy compressed air to the power turbine, causing it to rotate. The power turbine includes a shaft that may be used to drive the compressor.

Gas turbine engines generally take the form of an axial compressor or a centrifugal compressor, or some combination of both (i.e., an axial-centrifugal compressor). In an axial compressor, the flow of air through the compressor is at least substantially parallel to the axis of rotation. In a centrifugal compressor, the flow of air through the compressor is turned at least substantially perpendicular to the axis of rotation. An axial-centrifugal compressor includes an axial section (in which the flow of air through the compressor is at least substantially parallel to the axis of rotation) and a centrifugal section (in which the flow of air through the compressor is turned at least substantially perpendicular to the axis of rotation).

As mentioned above, compressors often include a diffuser to reduce the velocity of the air traveling from the compressor to the combustor, for example in a gas turbine engine with a through flow combustor. In addition, certain compressors (e.g., certain centrifugal compressors) have both a first diffuser located relatively early in the compressor flow passage away from the combustor and a second diffuser (often called a pre-diffuser) located later in the flow passage proximate the combustor. However, to date, it has been difficult to implement such additional diffusers, or pre-diffusers, in connection with compressors for gas turbine engines, for example those with axial compressors and/or in-line combustors. For example, such pre-diffusers have generally been significantly large. As a result, any placement of such a pre-diffuser in a centrifugal compressor could generally result in an undesirable increase in the length and/or weight of the engine. In addition, control of air flow through such pre-diffusers can also be difficult.

Accordingly, there is a need for an improved diffuser system for a compressor, such as a centrifugal compressor, for example without significantly increasing size and/or weight and/or with improved diffusion and/or control of air therein. There is also a need for a compressor, such as a centrifugal compressor, with an improved diffuser system, for example without significantly increasing size and/or weight and/or with improved diffusion and/or control of air therein. There is a further need for a gas turbine engine with a compressor, such as a centrifugal compressor, with an improved diffuser system, for example without significantly increasing size and/ or weight and/or with improved diffusion and/or control of air therein. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment of the present invention, a diffuser system for a compressor for a gas turbine engine is provided. The diffuser system comprises a diffuser and a plasma actuator. The diffuser comprises a first wall and a second wall. The first and second walls form a diffuser flow passage therebetween. The plasma actuator is disposed at least partially proximate the second wall. The plasma actuator is adapted to generate an electric field to ionize a portion of air flowing through the flow passage.

In accordance with another exemplary embodiment of the present invention, a compressor for a gas turbine engine is provided. The compressor comprises a housing, an impeller, a first diffuser, a de-swirl section, a second diffuser, and a plasma actuator. The impeller is rotationally mounted within the housing and configured to supply compressed air. The first diffuser is formed within the housing, and is configured to receive compressed air from the impeller. The de-swirl section is formed within the housing, and is configured to receive diffused air from the first diffuser and to de-swirl the air. The second diffuser is formed within the housing, and is coupled to receive the de-swirled air from the de-swirl section. The second diffuser comprises a first wall and a second wall. The first wall and the second wall are formed within the housing, and form a flow passage therebetween. The plasma actuator is disposed proximate the second wall. The plasma actuator is adapted to generate an electric field to ionize a portion of air flowing through the flow passage.

In accordance with a further exemplary embodiment of the present housing, a turbine, a combustor, and a compressor. The turbine is formed within the housing, and is configured to receive a combustion gas. The turbine is operable, upon receipt thereof, to supply a first drive force. The combustor is formed within the housing, and is configured to receive compressed air and fuel. The combustor is operable, upon receipt thereof, to supply the combustion gas to the turbine. The compressor is formed within the housing, and is configured to supply the compressed air to the combustor. The compressor comprises an impeller, a first diffuser, a de-swirl section, a second diffuser, and a plasma actuator. The impeller is rotationally mounted within the housing and configured to supply compressed air. The first diffuser is formed within the housing, and is configured to receive compressed air from the impeller. The de-swirl section is formed within the housing, and is configured to receive diffused air from the first diffuser and to de-swirl the air. The second diffuser is formed within the housing, and is coupled to receive the de-swirled air from the de-swirl section. The second diffuser comprises a first wall and a second wall. The first wall and the second wall are formed within the housing, and form a flow passage therebetween. The plasma actuator is disposed proximate the second wall. The plasma actuator is adapted to generate an electric field to ionize a portion of air flowing through the flow passage.

DETAILED DESCRIPTION

Figure 1:
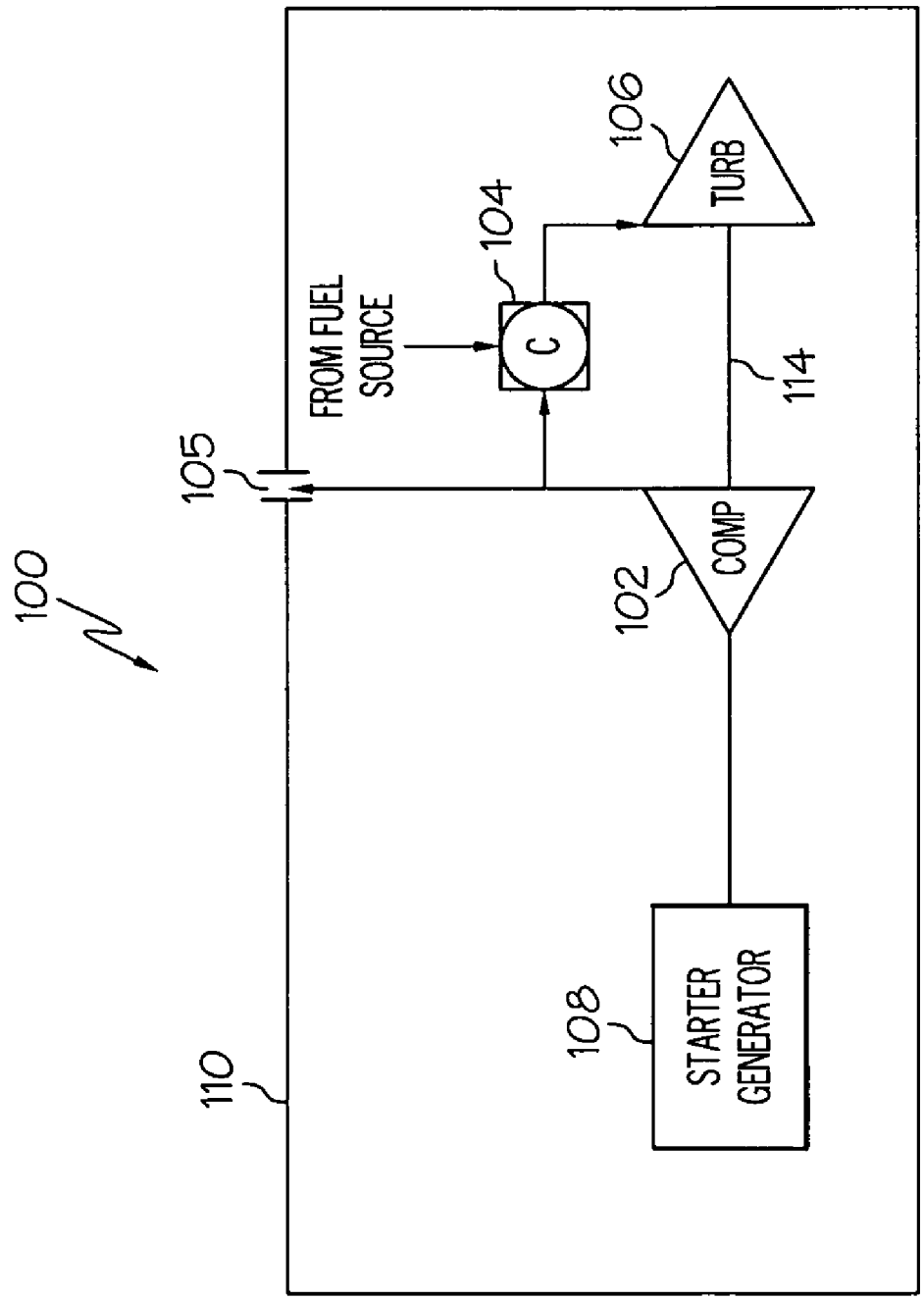
FIG. 1 is a schematic representation of a gas turbine engine, in accordance with an exemplary embodiment of the present invention.

FIG. 1 depicts an embodiment of an exemplary gas turbine engine 100 in a simplified cross-sectional format. In a preferred embodiment, the gas turbine engine 100 is part of a propulsion system for an aircraft. However, this may vary in other embodiments. The gas turbine engine 100 includes a compressor 102, a combustor 104, a turbine 106, and a starter-generator unit 108, all preferably housed within a single containment housing 110.

The compressor 102 is formed within the housing 110, and is configured to supply compressed air to the combustor 104. In a preferred embodiment depicted in FIGS. 2 and 2A and described further below in connection therewith, the compressor 102 comprises an impeller, a first diffuser, and a second diffuser.

During operation of the gas turbine engine 100, the compressor 102 draws ambient air into the housing 110. The compressor 102 compresses the ambient air, and supplies a portion of the compressed air to the combustor 104, and may also supply compressed air to a bleed air port 105. The bleed air port 105, if included, is used to supply compressed air to a non-illustrated environmental control system. It will be appreciated that the compressor 102 may be any one of numerous types of compressors now known or developed in the future.

The combustor 104 is formed within the housing 110, and is configured to receive compressed air and fuel and operable, upon receipt thereof, to supply the combustion gas to the turbine. Specifically, in a preferred embodiment, the combustor 104 receives the compressed air from the compressor 102, and also receives a flow of fuel from a non-illustrated fuel source. The fuel and compressed air are mixed within the combustor 104, and are ignited to produce relatively high-energy combustion gas. The combustor 104 may be implemented as any one of numerous types of combustors now known or developed in the future. Non-limiting examples of presently known combustors include various can-type combustors, various reverse-flow combustors, various through-flow combustors, and various slinger combustors.

No matter the particular combustor 104 configuration used, the relatively high-energy combustion gas that is generated in the combustor 104 is supplied to the turbine 106. The turbine 106 is formed within the housing 110, and is configured to receive the combustion gas and, upon receipt thereof, to supply a first drive force. As the high-energy combustion gas expands through the turbine 106, it impinges on the turbine blades (not shown in FIG. 1), which causes the turbine 106 to rotate. The turbine 106 includes an output shaft 114 that drives the compressor 102.

Figure 2:
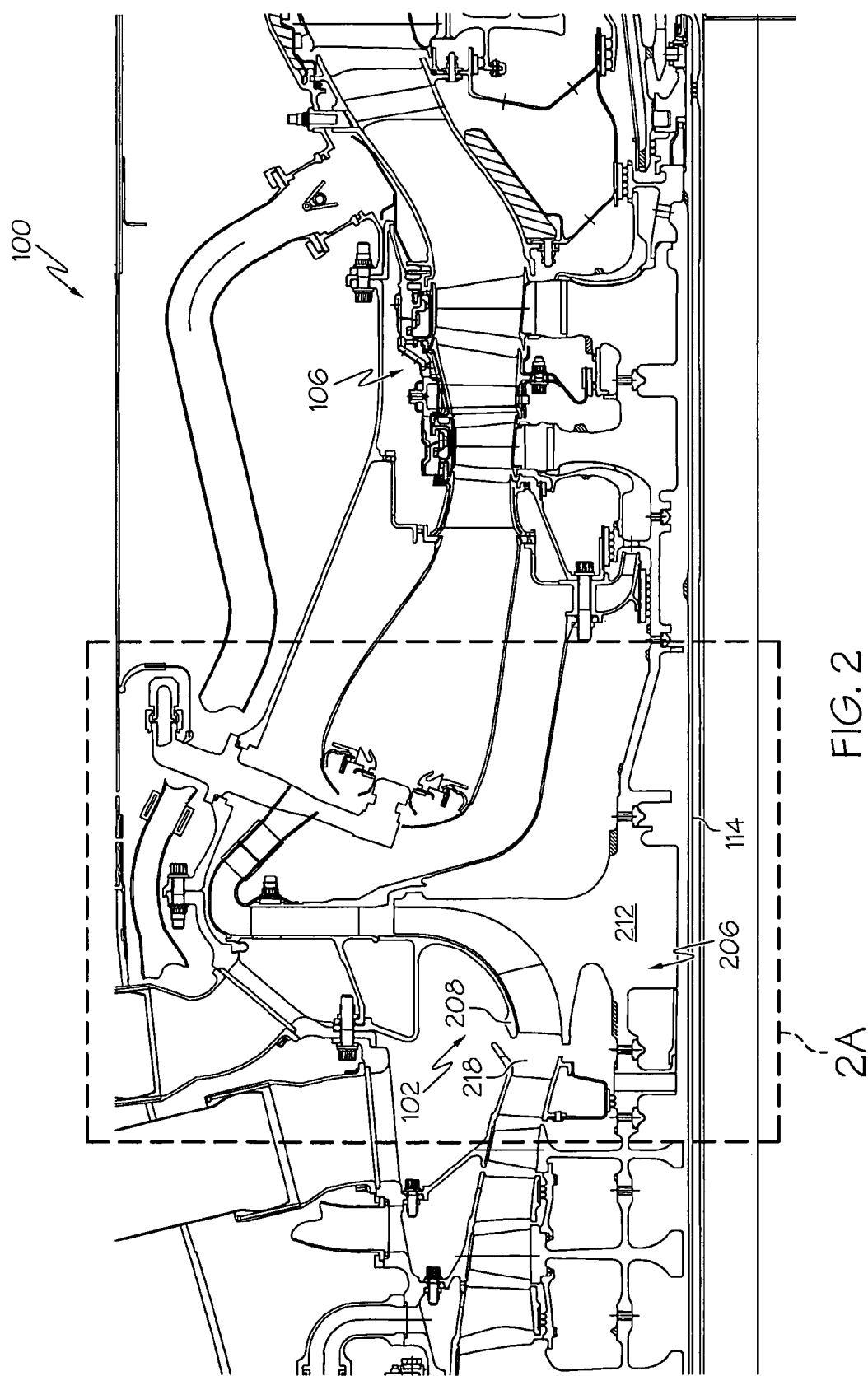
FIGS. 2 and 2A are cross sectional views of a portion of the gas turbine engine of FIG. 1, including a compressor, a combustor, and a turbine thereof, in accordance with an exemplary embodiment of the present invention.
Figure 2A:
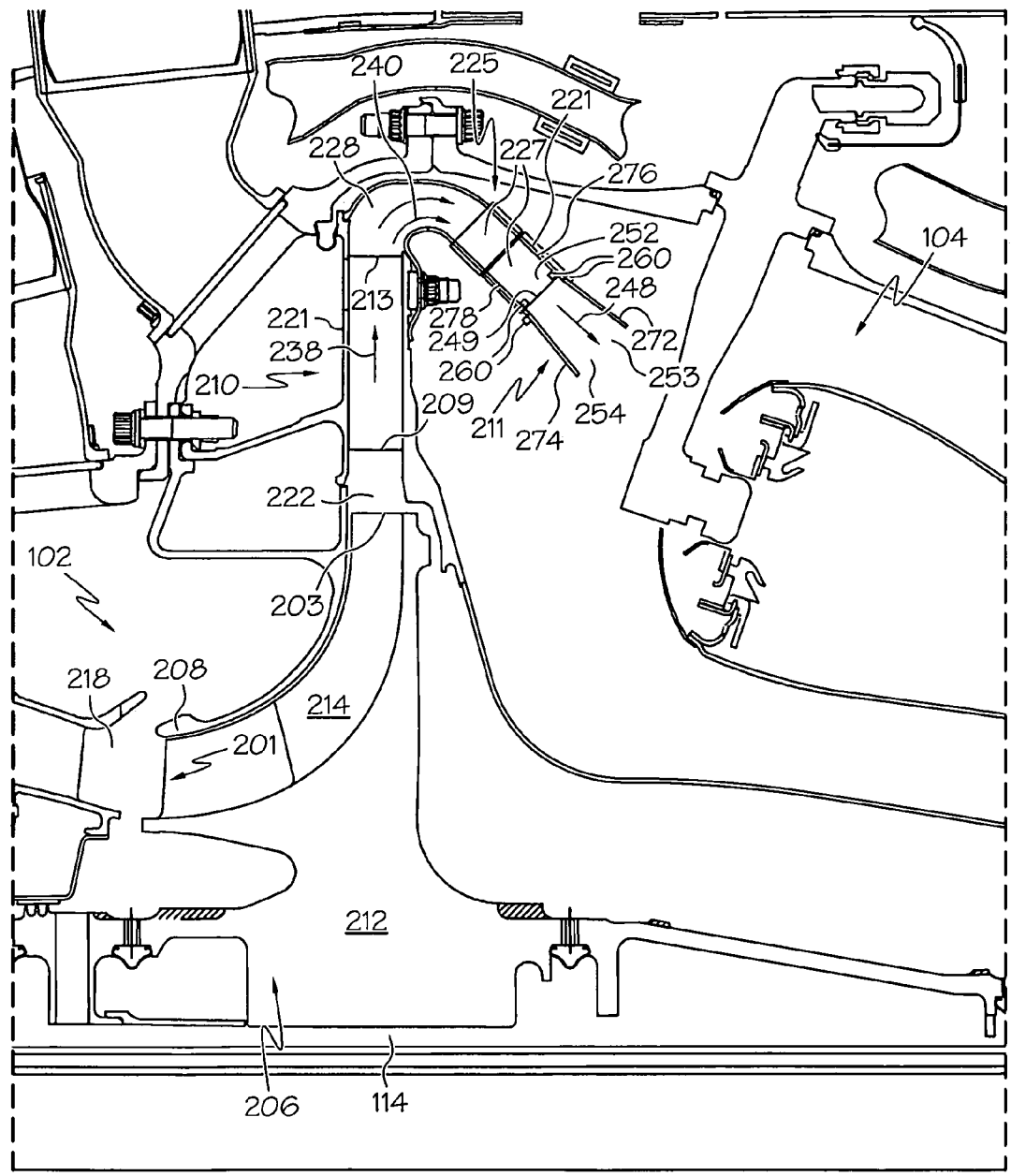

Turning now to FIGS. 2 and 2A, cross sectional views of a portion of the gas turbine engine 100 of FIG. 1 are provided, including the compressor 102, the combustor 104, and the turbines 106 of FIG. 1, in accordance with an exemplary embodiment of the present invention. In the depicted embodiment, the compressor 102 is an axial-centrifugal compressor and includes an impeller 206, a shroud 208, a first diffuser 210, and a second diffuser 211.

The impeller 206 is preferably rotationally mounted within the housing 110, and is most preferably mounted on the output shaft 114 via a hub 212. The impeller 206 is thus rotationally driven by either the turbine 106 or the starter-generator 108, as described above. A plurality of spaced-apart blades 214 extend generally radially from the hub 212 and together therewith define an impeller leading edge 201 and an impeller trailing edge 203. As is generally known, when the impeller 206 is rotated, the blades 214 draw air into the impeller 206, via the impeller leading edge 201, and increase the velocity of the air to a relatively high velocity. The relatively high velocity air is then discharged from the impeller 206, via the impeller trailing edge 203.

The shroud 208 is disposed adjacent to, and partially surrounds, the impeller blades 214. Shroud 208, among other things, cooperates with an annular inlet duct 218 to direct the air drawn into the gas turbine engine 100 by the compressor 102 into the impeller 206.

The first diffuser 210 is formed within a diffuser housing 221, and is configured to receive the compressed air from the impeller 206. In certain embodiments the diffuser housing 221 may comprise the above-referenced housing 110, and/or may be formed within the housing 110.

In one preferred embodiment, the first diffuser 210 comprises a radial diffuser that is disposed adjacent to, and surrounds a portion of, the impeller 206. The first diffuser 210 is configured to direct a flow of compressed air with a radial component to a diffused annular flow having an axial component. The first diffuser 210 forms a first diffuser flow passage 238 in a first portion 280 of the first diffuser 210, through which air is transported and diffused after it is received from the first diffuser 210 from the impeller 206. The first diffuser 210 additionally reduces the velocity of the air and increases the pressure of the air to a higher magnitude.

In certain embodiment, the first diffuser 210 may include a plurality of first diffuser vanes (not depicted) formed within the diffuser housing 221, with each first diffuser vane defining a different first diffuser flow passage 238. However, this may vary in other embodiments.

The first diffuser 210 also includes a de-swirl section 225 between the first portion 280 and the second diffuser 211. The de-swirl section 225 is coupled between the first portion 280 of the first diffuser 210 and the second diffuser 211. The de-swirl section 225 comprises a plurality of de-swirl vanes 227 (shown generally in FIGS. 2 and 2A coupled between the first and second diffusers 210, 211, and also referenced in FIGS. 3-8. Specifically, each de-swirl vane 227 is coupled to receive diffused air from the trailing edge 213 of the first portion 280 of the first diffuser 210 and to de-swirl the diffused air is it travels to the second diffuser 211, discussed below.

Also, in a preferred embodiment, the diffuser housing 221 further houses a bend 228 coupled between the first diffuser 210 and the de-swirl section 225. Preferably, this bend 228 provides a continuous turn between the first diffuser 210 and the de-swirl section 225, and bends the air from a predominantly radial diffuser (i.e., the first diffuser 210, in this preferred embodiment) to a predominantly axial diffuser (i.e., the second diffuser 211, in this preferred embodiment). However, this, along with certain other features described herein and/or depicted in FIGS. 2 and 2A and/or the other Figures, may vary in other embodiments.

The diffuser housing 221 also includes and defines a first diffuser air inlet 222 and a first diffuser air outlet 224. The first diffuser air inlet 222 is disposed proximate a first diffuser leading edge 209, and is coupled between the impeller 206 and the first diffuser 210. The first diffuser 210 receives the compressed air from the impeller 206 via the first diffuser air inlet 222. The first diffuser air outlet 224 is disposed proximate a first diffuser trailing edge 213, and is coupled between a first portion 280 of the first diffuser 210 and the de-swirl section 225, and more specifically between the first portion 280 and the bend 228, in the depicted embodiment. The first diffuser 210 supplies the diffused and compressed air to via the first diffuser air outlet 224 to the bend 228, where the diffused and compressed air is further supplied to the de-swirl section 225.

The plurality of de-swirl vanes 227 are formed within the diffuser housing 221, and extend around the bend 228 between the first portion 280 of the first diffuser 210 and the second diffuser 211. The plurality of de-swirl vanes 227 define a plurality of de-swirl flow passages 240 through the de-swirl section 225. Each de-swirl flow passage 240 is in fluid communication with the first diffuser flow passage 238. While the plurality of de-swirl vanes 227 is depicted as having two rows of vanes, it will be appreciated that this may vary in other embodiments, for example in that there may be less than two rows of vanes or greater than two rows of vanes in various embodiments.

The second diffuser 211 is also preferably formed within the diffuser housing 221. The second diffuser 211 is configured to further diffuse and direct the compressed air toward and to the combustor 104. Specifically, in the depicted embodiment, the second diffuser 211 forms a second diffuser flow passage 248 through which air is transported and diffused after it is received by the second diffuser 211 from the first diffuser 210. In so doing, the second diffuser 211 additionally reduces the velocity of the air and increases the pressure of the air to a higher magnitude. The second diffuser 211 can be considered a pre-diffuser as the term is commonly used in the field in describing a diffuser disposed proximate the combustor of a gas turbine engine.

In a preferred embodiment, the second diffuser 211 is coupled to receive the compressed air from the first diffuser 210, preferably via the de-swirl vanes 227 of the de-swirl section 225. In one preferred embodiment, the second diffuser 211 comprises an axial diffuser that is disposed adjacent to the de-swirl section 225 and around the bend from the first diffuser 210.

Figure 7:
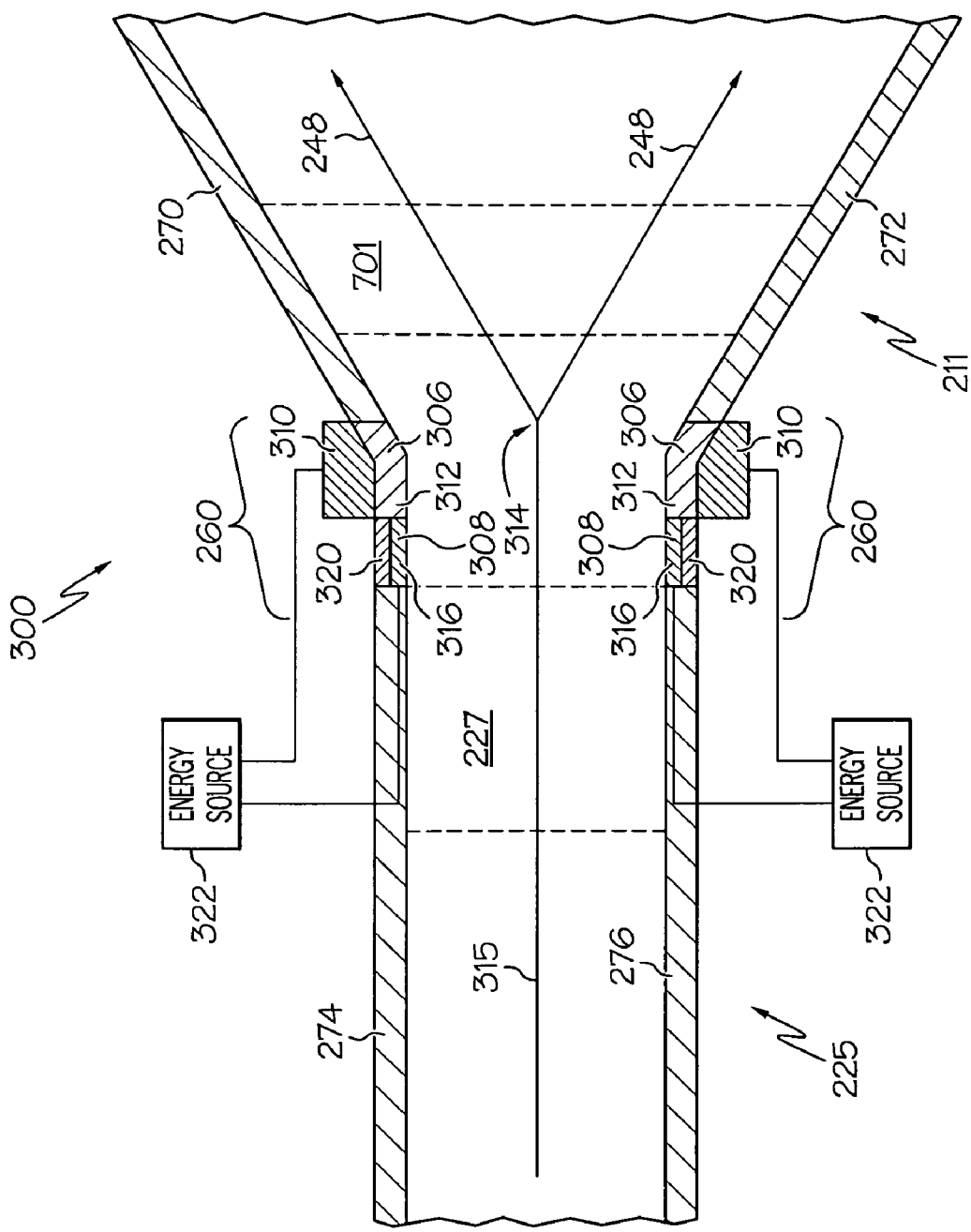
FIG. 7 is a close-up view of a portion of the compressor of FIGS. 2 and 2A, including portions of a de-swirl section and a pre-diffuser thereof, in accordance with another exemplary embodiment of the present invention.

In certain embodiment, the second diffuser 211 may include a plurality of vanes (not depicted in FIGS. 2 and 2A) formed within the diffuser housing 221, with each first diffuser vane defining a different second diffuser flow passage 248 through the second diffuser 211. For example, an exemplary set of such second diffuser vanes 701 is depicted in FIG. 7 as discussed further below in accordance with one exemplary embodiment of the present invention. However, this may vary in other embodiments.

In certain other embodiments, the second diffuser 211 may include one or more other housings other than the above-referenced diffuser housing 221 and/or housing 110. Also, as mentioned above, in certain embodiments the diffuser housing 221 may comprise the above-referenced housing 110, and/or may be formed within the diffuser housing 221.

In certain preferred embodiments, the diffuser housing 221 further includes and defines a second diffuser air inlet 252 and a second diffuser air outlet 254. The second diffuser air inlet 252 is coupled between the de-swirl section 225 and the second diffuser 211, and is disposed proximate a second diffuser leading edge 249. The second diffuser 211 receives the compressed and de-swirled air from the de-swirl section 225 via the second diffuser air inlet 252. The second diffuser air outlet 254 is coupled between the second diffuser 211 and the combustor 104, and is disposed proximate a second diffuser trailing edge 253. The second diffuser 211 supplies the further diffused and compressed air to the combustor 104 via the second diffuser air outlet 254.

In the depicted embodiment, the second diffuser 211 includes plasma actuators 260 disposed in proximity thereto. The plasma actuators 260 are preferably disposed at least partially proximate first and second walls 272, 274, respectively of the second diffuser 211. For example, in the depicted embodiment, plasma actuators are disposed on or within the first and second walls 272, 274 and corresponding first and second walls of the de-swirl section 225. The plasma actuators 260 are adapted to generate an electric field to ionize a portion of air flowing through the flow passage. The plasma actuators 260 thereby allow for the air travelling through the second diffuser 211 to be diffused more rapidly or effectively, or for the air to be directed more effectively through the second diffuser 211.

Each plasma actuator 260 improves control of the airflow through the second diffuser flow passage 248, and may be especially effective when implemented into diffuser system flow paths having relatively small dimensions. In this regard, each plasma actuator 260 is adapted to generate an electric field across a designated area of the second diffuser flow passage 248 such that when air flows through the electric field, a first portion thereof ionizes to become a plurality of ionized species, which may include positively and negatively charged species. The plurality of ionized species may be capable of inducing a second portion of the air to flow in a desired direction, by attracting charged particles therein to the designated area of the second diffuser flow passage 248. According to one preferred embodiment, the designated area may be a location in the second diffuser flow passage 248 at which flow separation from one or both of the first and second walls 272, 274 may occur. The plasma actuators 260 will now be described in further detail below in connection with FIGS. 3-8 in accordance with various exemplary embodiments of the present invention.

Turning now to FIGS. 3-8, close-up views of various exemplary embodiments of a diffuser system 300. The diffuser system 300 comprises a portion of a de-swirl section 225 and/or second diffuser 211 (such as the de-swirl section 225 and the second diffuser 211 of FIGS. 2 and 2A) including one or more plasma actuators 260 are illustrated, in accordance with various different exemplary embodiments of the present invention.

Figure 3:
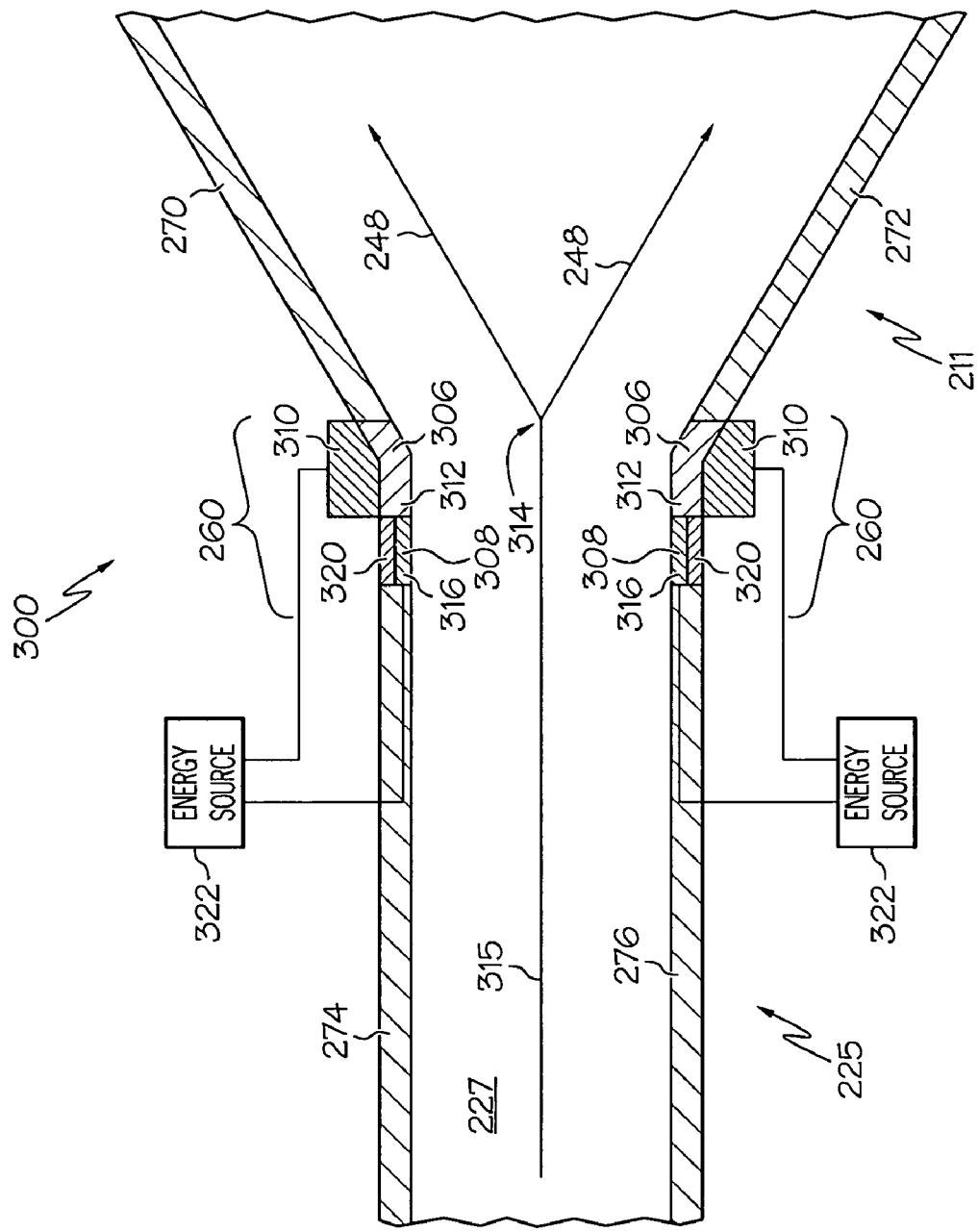
FIG. 3 is a close-up view of a portion of the compressor of FIGS. 2 and 2A, including portions of a de-swirl section and a pre-diffuser thereof, in accordance with an exemplary embodiment of the present invention.

In the first exemplary embodiment of FIG. 3, the de-swirl section 225 and/or second diffuser 211 includes two plasma actuators 260. One of the plasma actuators 260 is disposed proximate the first and third walls 270, 274 of the second diffuser 211 and the de-swirl section 225 of FIGS. 2 and 2A, respectively, and the other plasma actuator 260 is disposed proximate the second and fourth walls 272, 276 of the second diffuser 211 and the de-swirl section 225 of FIGS. 2 and 2A, respectively. In this exemplary embodiment, the air in the second diffuser flow passage 248 of FIGS. 2 and 2A is directed in directions toward both the first and second walls 270, 272 of the second diffuser 211, to thereby improve diffusion of the air within the second diffuser flow passage. Also in the embodiment of FIG. 3, the first and second walls 270, 272 of the second diffuser 211 diverge from one another and from the respective first and second walls 274, 276 of the de-swirl section 225 to increase the volume of the second diffuser flow passage 248 and to further enhance the diffusion of the air in the second diffuser flow passage 248 formed therebetween.

Figure 4:
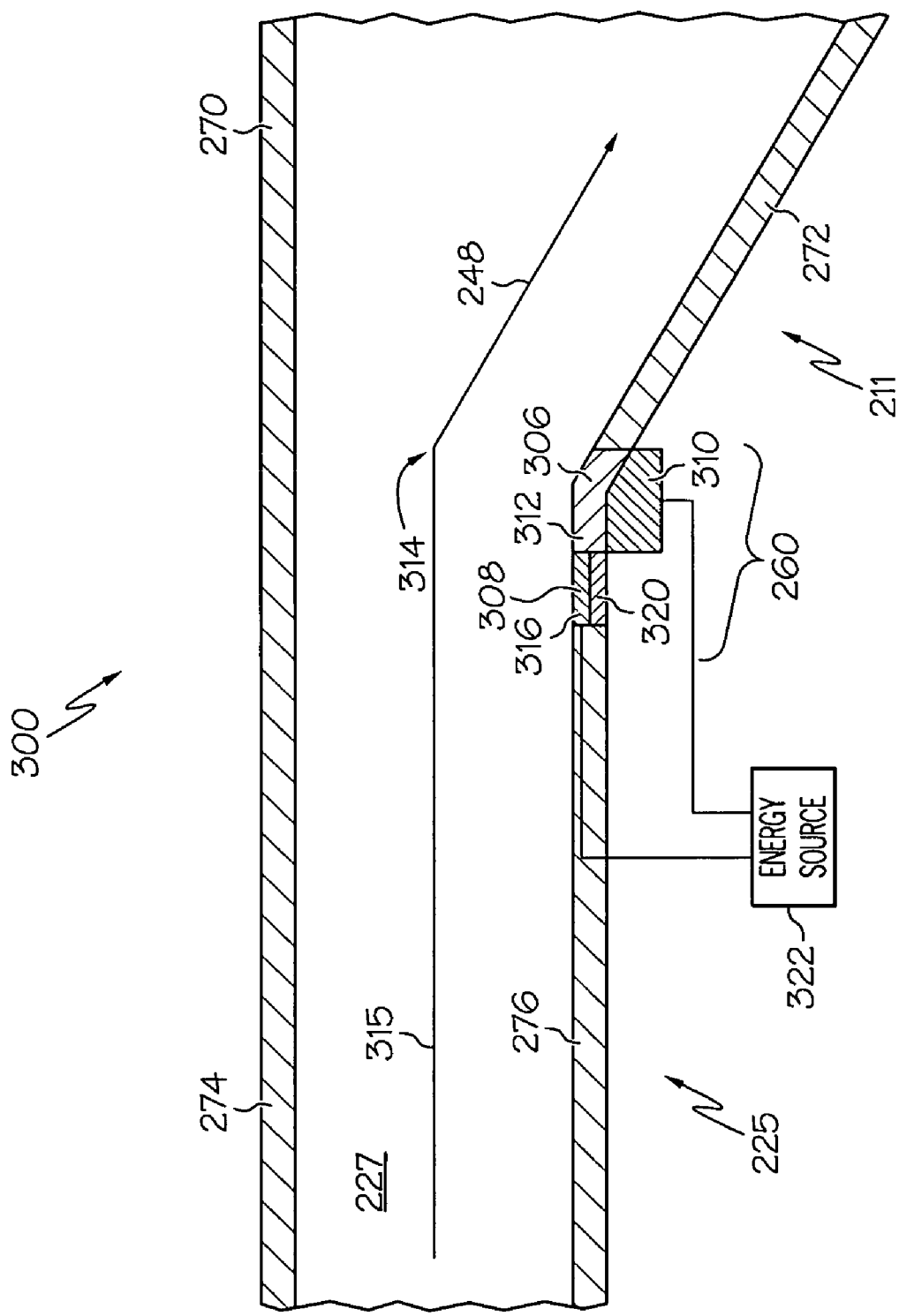
FIG. 4 is a close-up view of a portion of the compressor of FIGS. 2 and 2A, including portions of a de-swirl section and a pre-diffuser thereof, in accordance with another exemplary embodiment of the present invention.

In the second exemplary embodiment of FIG. 4, the de-swirl section 225 and/or second diffuser 211 includes a single plasma actuator 260 disposed proximate the second and fourth walls 272, 276 of the second diffuser 211 and the de-swirl section 225 of FIGS. 2 and 2A, respectively. In this exemplary embodiment, the air in the second diffuser flow passage 248 of FIGS. 2 and 2A is directed in a direction toward the second wall 272 of the second diffuser 211, for example if cooling of the combustor 104 and/or any components thereof is desired. Also in the embodiment of FIG. 4, the first wall 270 of the second diffuser 211 remains at least substantially parallel with the respective third wall 274 of the de-swirl section 225 while the second wall 272 of the second diffuser 211 diverges from the respective fourth wall 276 of the de-swirl section 225 to further facilitate this directional flow.

Figure 5:
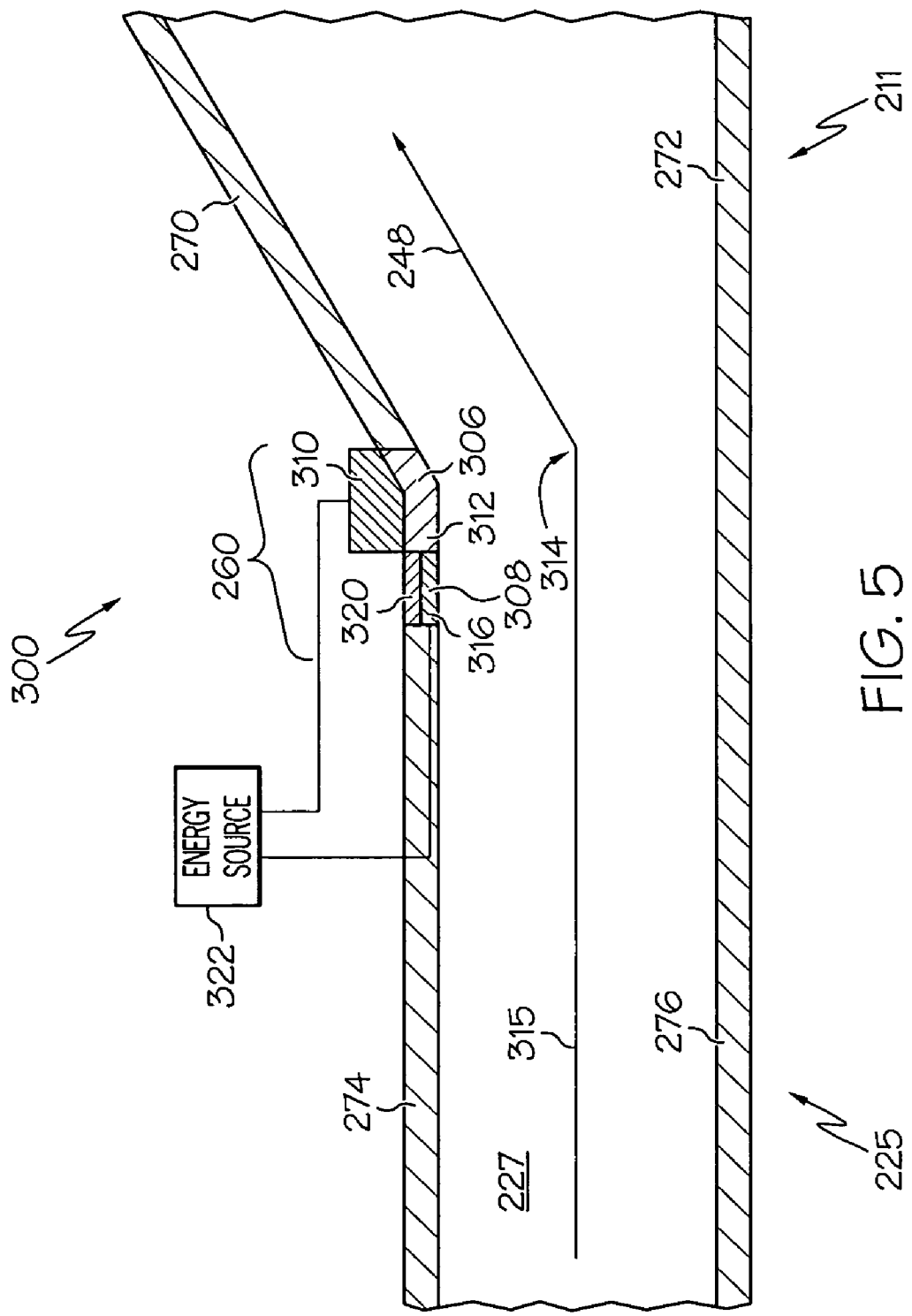
FIG. 5 is a close-up view of a portion of the compressor of FIGS. 2 and 2A, including portions of a de-swirl section and a pre-diffuser thereof, in accordance with another exemplary embodiment of the present invention.

In the third exemplary embodiment of FIG. 5, the de-swirl section 225 and/or second diffuser 211 includes a single plasma actuator 260 disposed proximate the first and third walls 270, 274 of the second diffuser 211 and the de-swirl section 225 of FIGS. 2 and 2A, respectively. In this exemplary embodiment, the air in the second diffuser flow passage 248 of FIGS. 2 and 2A is directed in a direction toward the first wall 270 of the second diffuser 211. In yet other exemplary embodiments, the number and/or placement of the plasma actuators 260 may be varied in accordance with different intended purposes and desired effects. Also in the embodiment of FIG. 5, the second wall 272 of the second diffuser 211 remains at least substantially parallel with the respective fourth wall 276 of the de-swirl section 225 while the first wall 270 of the second diffuser 211 diverges from the respective third wall 274 of the de-swirl section 225 to further facilitate this directional flow.

Figure 6:
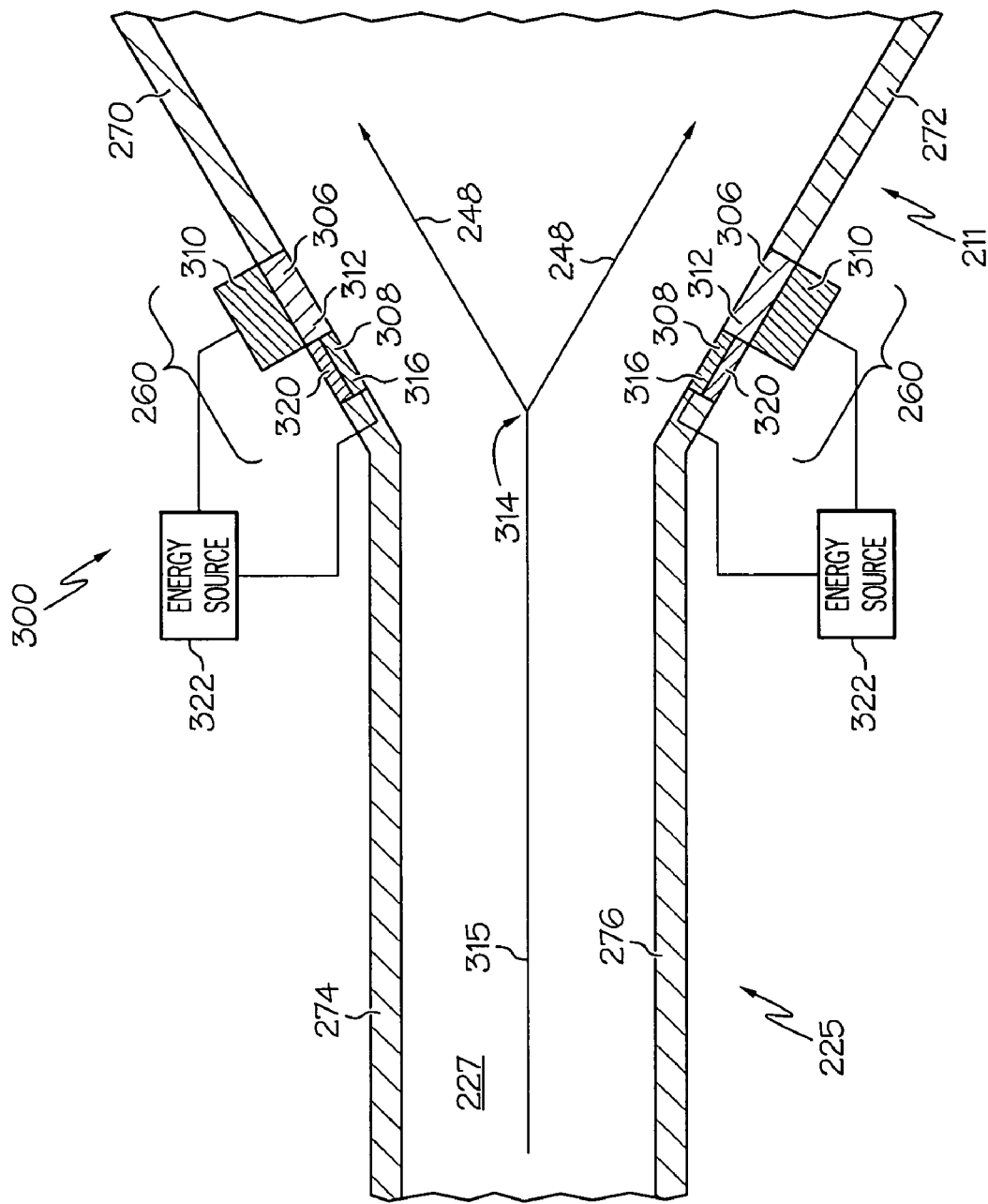
FIG. 6 is a close-up view of a portion of the compressor of FIGS. 2 and 2A, including portions of a de-swirl section and a pre-diffuser thereof, in accordance with another exemplary embodiment of the present invention.

In the fourth exemplary embodiment of FIG. 6, the plasma actuators 260 are positioned solely along the second diffuser 211, that is, after or downstream of the point, bend, or region at which the de-swirl section 225 meets the second diffuser 211. One of the plasma actuators 260 is disposed proximate the first wall 270 of the second diffuser 211 of FIGS. 2 and 2A, and the other plasma actuator 260 is disposed proximate the second wall 272 of the second diffuser 211 of FIGS. 2 and 2A. Similar to the embodiment of FIG. 3, in this exemplary embodiment, the air in the second diffuser flow passage 248 of FIGS. 2 and 2A is directed in directions toward both the first and second walls 270, 272 of the second diffuser 211, to thereby improve diffusion of the air within the second diffuser flow passage. Also similar to the embodiment of FIG. 3, in the embodiment of FIG. 6 the first and second walls 270, 272 of the second diffuser 211 diverge from one another and from the respective first and second walls 274, 276 of the de-swirl section 225 to increase the volume of the second diffuser flow passage 248 and to further enhance the diffusion of the air in the second diffuser flow passage 248 formed therebetween.

However, as depicted in FIG. 6, in this embodiment, the divergence of the air caused by the plasma actuators 260 occurs further downstream as compared with the embodiment of FIG. 3, due to the placement of the plasma actuators 260. It will be appreciated that the placement of the plasma actuators 260 may vary in each of the embodiments of FIGS. 3-8. Preferably, in each of these embodiments, the one or more plasma actuators 260 are placed within or shortly downstream of the joining region between the de-swirl section 225 and the second diffuser 211. However, this may also vary in other embodiments.

Figure 8:
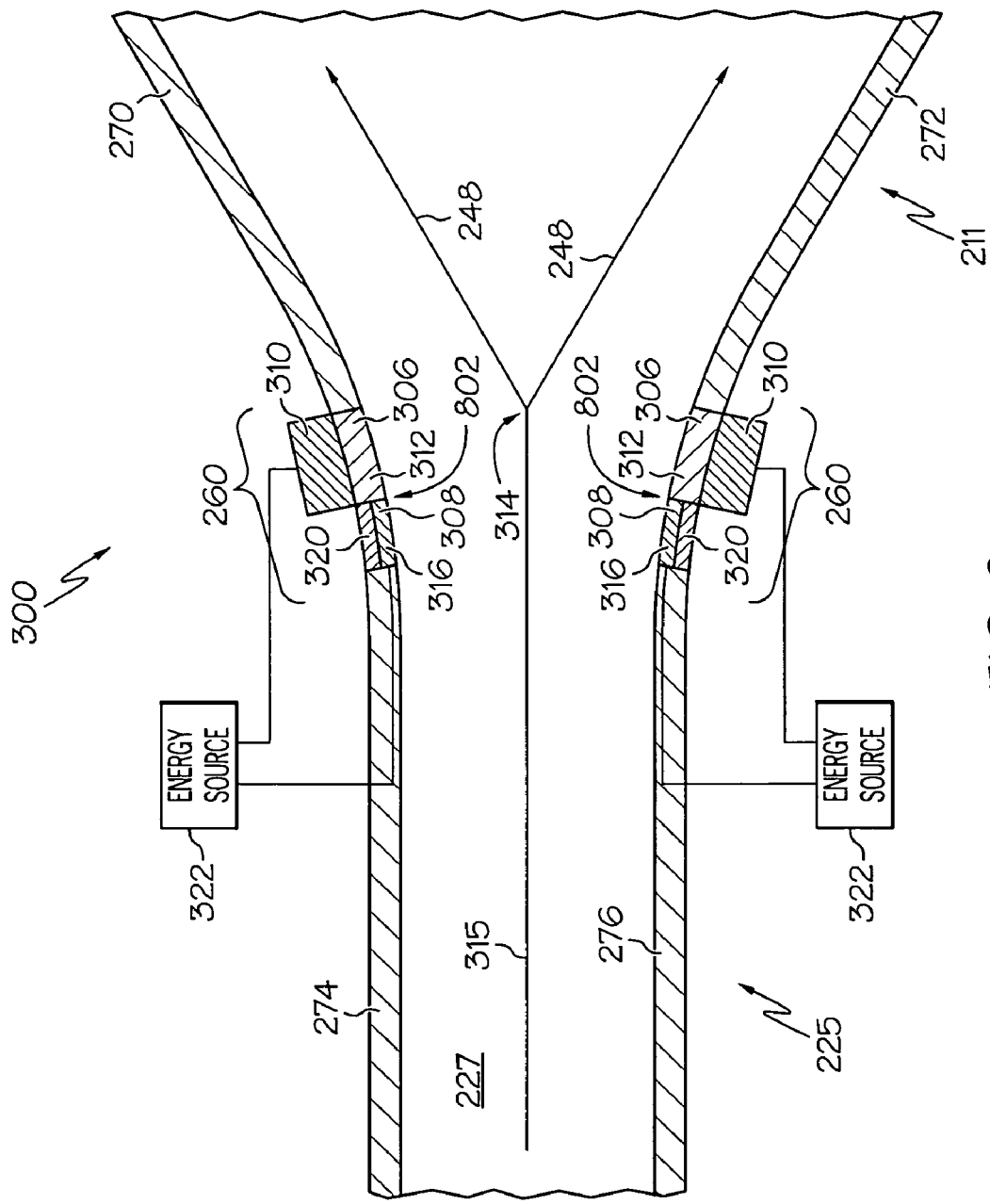
FIG. 8 is a close-up view of a portion of the compressor of FIGS. 2 and 2A, including portions of a de-swirl section and a pre-diffuser thereof, in accordance with another exemplary embodiment of the present invention.

In the fifth and sixth exemplary embodiments of FIGS. 7 and 8, respectively, the embodiment of FIG. 3 is depicted with certain other modifications. Specifically, in FIG. 7, the plasma actuators 260 of FIG. 3 are depicted in connection with a second diffuser 211 that also includes vanes 701 therein similar to the above-described vanes 227 of the de-swirl section 225. In FIG. 7, the plasma actuators 260 of FIG. 3 are depicted in connection with a de-swirl section 225 and a second diffuser 211 having curved walls 274, 276 and 270, 272, respectively. Accordingly, in the embodiment of FIG. 8, the region in which the de-swirl section 225 meets the second diffuser 211 is marked by a bend 802 as shown in FIG. 8 rather than the pointed connection of FIGS. 3-7. It will be appreciated that an of the embodiments of FIGS. 3-8 may include a second diffuser with vanes such as the vanes 701 of FIG. 7 and/or curved walls 270, 272, 274, and 276 with a connecting bend 802 of FIG. 8 at which the de-swirl section 225 and the second diffuser 211 join, among other possible variations to these and/or other embodiments.

In each of the exemplary embodiments of FIGS. 3-8, each plasma actuator 260 includes a dielectric component 306 and a pair of electrodes 308, 310. Specifically, in the embodiments of FIGS. 3 and 6-8, the de-swirl section 225 and/or second diffuser 211 includes (i) a first plasma actuator 260 including a dielectric component 306 disposed within or proximate the first wall 270 of the second diffuser 211 and/or the third wall 274 of the de-swirl section 225, a first electrode 308 disposed within or proximate the third wall 274 of the de-swirl section 225, and a second electrode 310 disposed proximate first wall 270 of the second diffuser 211; and (ii) a second plasma actuator 260 including a dielectric component 306 disposed within or proximate the second wall 272 of the second diffuser 211 and/or the fourth wall 276 of the de-swirl section 225, a first electrode 308 disposed within or proximate the fourth wall 276 of the de-swirl section 225, and a second electrode 310 disposed proximate second wall 272 of the second diffuser 211. In the embodiment of FIG. 4, the de-swirl section 225 and/or second diffuser 211 includes a single plasma actuator 260 including a dielectric component 306 disposed within or proximate the second wall 272 of the second diffuser 211 and/or the fourth wall 276 of the de-swirl section 225, a first electrode 308 disposed within or proximate the fourth wall 276 of the de-swirl section 225, and a second electrode 310 disposed proximate second wall 272 of the second diffuser 211. In the embodiment of FIG. 5, the de-swirl section 225 and/or second diffuser 211 includes a single plasma actuator 260 including a dielectric component 306 disposed within or proximate the first wall 270 of the second diffuser 211 and/or the third wall 274 of the de-swirl section 225, a first electrode 308 disposed within or proximate the third wall 274 of the de-swirl section 225, and a second electrode 310 disposed proximate first wall 270 of the second diffuser 211. This may vary in yet other embodiments.

Each dielectric component 306 is preferably disposed in the first wall 270 of the second diffuser 211, the second wall 272 of the second diffuser 211, the 274, the third wall 274 of the de-swirl section 225, and/or the fourth wall 276 of the de-swirl section 225 of FIGS. 2 and 2A. The dielectric component 306 may include a dielectric material that may provide a desired resistance when energy is supplied to the electrodes 308, 310 to form an electric field, where the desired resistance has a magnitude that is sufficient to cause arcing upon generation of the electric field, in an embodiment. In another embodiment, the dielectric material may be capable of maintaining structural integrity when exposed to temperatures of in a range of from about 175° C. to about 595° C.

To provide the electric field around a circumference of one or more of the first wall 270 of the second diffuser 211, the second wall 272 of the second diffuser 211, the 274, the third wall 274 of the de-swirl section 225, and/or the fourth wall 276 of the de-swirl section 225, the dielectric component 306 may be configured as a sleeve, in an embodiment. For example, in one exemplary embodiment, the dielectric component 306 sleeve may be disposed in a ring-shaped cutout formed through one or more of the first wall 270 of the second diffuser 211, the second wall 272 of the second diffuser 211, the 274, the third wall 274 of the de-swirl section 225, and/or the fourth wall 276 of the de-swirl section 225, and may be mounted thereto. In another exemplary embodiment, the dielectric component 306 sleeve may be bolted, screwed into, adhered, or otherwise attached to one or more of the first, second, third, and/or fourth walls 270, 272, 274, and 276 of the de-swirl section 225 and/or the second diffuser 211.

In another embodiment, the dielectric component 306 may be integrally formed as part of the de-swirl section 225 and/or the second diffuser 211. For example, one or more of the first, second, third, and/or fourth walls 270, 272, 274, and 276 may be formed around at least a portion of the dielectric component 306 sleeve such that a portion thereof is embedded in one or more of the first, second, third, and/or fourth walls 270, 272, 274, and 276. In an embodiment, the sleeve may include a plurality of tabs that are embedded into one or more of the first, second, third, and/or fourth walls 270, 272, 274, and 276.

The dielectric component 306 may be a continuous piece of dielectric material. In another example, the dielectric component 306 may include a plurality of pieces of dielectric material that are disposed adjacent to one another to form a ring. The plurality of pieces may be equally spaced apart from each other or each piece may be disposed adjacent to two other pieces circumferentially around one or more of the first wall 270 of the second diffuser 211, the second wall 272 of the second diffuser 211, the 274, the third wall 274 of the de-swirl section 225, and/or the fourth wall 276 of the de-swirl section 225. In embodiments in which the de-swirl section 225 and/or second diffuser 211 may have a limited allowable footprint within the engine, the dielectric component 306 may have a thickness that is substantially equal to or less than the thickness of one or more of the first wall 270 of the second diffuser 211, the second wall 272 of the second diffuser 211, the 274, the third wall 274 of the de-swirl section 225, and/or the fourth wall 276 of the de-swirl section 225. In other configurations in which the dimensions of the de-swirl section 225 and/or second diffuser 211 may be larger or smaller, the dielectric component 306 may be thicker or thinner.

The first electrode 308 is disposed on the first side 312 of the dielectric component 306. In this regard, the first electrode 308 may be exposed to the air to be ionized within a diffuser system flow path 314. In an embodiment, the first electrode 308 is configured such that flow disruption along diffuser system flow path 314 is minimized. For example, the first electrode 308 may be a ribbon of conductive material that may be attached to a surface of the first side 312 of the dielectric component 306. The first electrode 308 may extend around a circumference of the dielectric component 306 and may have a thickness that is less than a thickness of one or more of the first, second, third, and/or fourth walls 270, 272, 274, and 276.

In another embodiment, a shallow groove 316 for receiving the electrode 308 may be formed around the circumference of the surface of the first side 312 of the dielectric component 306 and may be configured to allow an exposed surface of the first electrode 308 to remain flush with adjacent surfaces of the first side 312 of the dielectric component 306. In another embodiment, the first electrode 308 may be made up of a plurality of conductive ribbons of materials, disposed circumferentially around the first side 312 of the dielectric component 306. For example, in an embodiment, the ribbons of materials may be substantially identical in dimensions. Alternatively, the ribbons of materials may not be identical in dimensions and/or may have dimensions that are larger or smaller than the above-given ranges.

The second electrode 310 may be disposed on the second side 320 of the dielectric component 306 opposite the first side 312 and outside of the diffuser system flow path 314. In an embodiment, the second electrode 310 is disposed axially downstream relative to the first electrode 308, as shown in FIGS. 3-8. In other embodiments, the electrodes 308, 310 may be aligned with each other and disposed at substantially the same axial location on the dielectric component 306. In still another embodiment, the second electrode 310 may be located upstream from the first electrode 308. Because the second electrode 310 is not exposed to the air in diffuser system flow path 314, the second electrode 310 may have any suitable configuration for producing the electric field across diffuser system flow path 314.

In one embodiment, the first and second electrodes 308, 310 may have substantially similar configurations and may be made of substantially similar materials. According to another embodiment, the first and second electrodes 308, 310 may be made of different materials and/or may have different configurations. In any case, each electrode 308, 310 is electrically coupled to an energy source 322 that is adapted to provide a current thereto. For example, the energy source 322 may be an alternating current power supply. In another example, the energy source 322 may be a direct current power supply. In either embodiment, the energy source 322 may be located locally, such as adjacent to the de-swirl section 225 and/or the second diffuser 211, or may be located remotely. In an embodiment, the energy source 322 may be the gas turbine engine 100 (FIG. 1).

As mentioned briefly above, the first electrode 308 is preferably disposed on the first side 312 of the dielectric component 306. In this regard, the first electrode 308 may be exposed to the air to be ionized within a diffuser system flow path 314. In accordance with certain preferred embodiments depicted in FIGS. 3-8, the diffuser system flow path 314 comprises an overall flow path or flow passage comprising the above-referenced second diffuser flow passage 248 of FIGS. 2 and 2A along with a de-swirl flow passage 315 between the third and fourth walls 274, 276 of the de-swirl section 225.

In one exemplary embodiment, the second electrode 310 may include a ribbon of conductive material that is attached to an inner diameter of the dielectric component 306. In other exemplary embodiments, the second electrode 310 may be thicker or thinner. In still another embodiment, the second electrode 310 may include a plurality of conductive ribbons of materials, disposed circumferentially around the second side 320 of the dielectric component 306. For example, in an embodiment, the ribbons of materials may be substantially identical in dimensions. Alternatively, the ribbons of materials may not be identical in dimensions and/or may have dimensions that are larger or smaller than the above-give ranges.

Each electrode 308, 310 is electrically coupled to an energy source 322 that is adapted to provide a current thereto. For example, the energy source 322 may be an alternating current power supply. In another example, the energy source 322 may be a direct current power supply. In either embodiment, the energy source 322 may be located locally, such as adjacent to the de-swirl section 225 and/or second diffuser 211, or may be located remotely. In an embodiment, the energy source 322 may be the gas turbine engine 100 (FIG. 1). The number and/or type of energy sources 322 may also vary in other embodiments. For example, the electrodes 308, 310 of different plasma actuators 260 can be coupled to the same and/or different energy sources 322 in various embodiments of the present invention.

Accordingly, improved gas turbine engines, compressors, diffuser systems, and components thereof are provided. These gas turbine engines, compressors, diffuser systems, and components thereof provide potentially improved diffusion and/or directional control of air therethrough, and/or without significantly increasing the size and/or weight thereof, in accordance with various exemplary embodiments of the present invention.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A diffuser system disposed downstream of a compressor section of a gas turbine engine, the diffuser system comprising:
    a diffuser of the diffuser system comprising a first wall, a second wall and de-swirl vanes, the first and second walls forming a diffuser flow passage therebetween; and
    a plasma actuator disposed downstream of a leading edge of the de-swirl vanes and at least partially proximate the second wall, the plasma actuator generate an electric field to ionize a portion of air flowing through the flow passage and supply to a combustor.

2. The diffuser system of claim 1, wherein the plasma actuator comprises:
    a dielectric component disposed at least partially proximate the second wall, the dielectric component having a first side and a second side;
    a first electrode disposed on the first side of the dielectric component; and
    a second electrode disposed on the second side of the dielectric component.

3. The diffuser system of claim 2, wherein:
the second wall includes a cutout formed therein, and
the dielectric component is disposed in the cutout.

4. The diffuser system of claim 2, wherein:
the second wall includes a ring-shaped cutout formed therein, and
the dielectric component comprises a sleeve disposed in the ring-shaped cutout.

5. The diffuser system of claim 2, wherein:
the dielectric component is coupled to the second wall.

6. The diffuser system of claim 2, wherein:
the dielectric component comprises a continuous piece of dielectric material.

7. The diffuser system of claim 1, further comprising:
a de-swirl section comprising a third wall and a fourth wall forming a de-swirl flow passage therebetween for the air to flow therethrough to the diffuser;
wherein:
    the first electrode is disposed proximate or within the fourth wall; and
    the second electrode is disposed proximate or within the second wall.

8. The diffuser system of claim 7, further comprising:
a second plasma actuator disposed at least partially proximate the first wall and the third wall, the second plasma actuator comprising:
    a second dielectric component disposed at least partially proximate the first wall, the dielectric component having a first side and a second side;
    a third electrode disposed on the first side of the dielectric component proximate the third wall; and
    a second electrode disposed on the second side of the dielectric component proximate the first wall.

9. A compressor for a gas turbine engine, the compressor comprising:
    a housing;
    an impeller rotationally mounted within the housing and configured to supply compressed air;
    a first diffuser disposed radially outward from the impeller, the first diffuser formed within the housing and configured to receive compressed air from the impeller;
    a de-swirl section formed within the housing and configured to receive diffused air from the first diffuser and to de-swirl the air;
    a second diffuser disposed downstream from the first diffuser, the second diffuser formed within the housing and coupled to receive the de-swirled air from the de-swirl section, the second diffuser comprising a first wall formed within the housing and a wall formed within the housing, the first and second walls forming a flow passage therebetween; and
    a plasma actuator disposed proximate the second wall, the plasma actuator adapted to generate an electric field to ionize a portion of air flowing through the flow passage and supply to a combustor.

10. The compressor of claim 9, wherein the plasma actuator comprises:
    a dielectric component disposed at least partially proximate the second wall, the dielectric component having a first side and a second side;
    a first electrode disposed on the first side of the dielectric component; and
    a second electrode disposed on the second side of the dielectric component.

11. The compressor of claim 10, wherein:
the second wall includes a cutout formed therein, and
the dielectric component is disposed in the cutout.

12. The compressor of claim 10, wherein:
the dielectric component is coupled to the second wall.

13. The compressor of claim 9, wherein:

the de-swirl section comprises a third wall and a fourth wall forming a de-swirl flow passage therebetween for the air to flow therethrough to the diffuser;

wherein:

the first electrode is disposed proximate or within the fourth wall; and the second electrode is disposed proximate or within the second wall.

14. The compressor of claim 13, further comprising:

a second plasma actuator disposed at least partially proximate the first wall and the third wall, the second plasma actuator comprising:

a second dielectric component disposed at least partially proximate the first wall, the dielectric component having a first side and a second side;

a third electrode disposed on the first side of the dielectric component proximate the third wall; and a second electrode disposed on the second side of the dielectric component proximate the first wall.

15. A gas turbine engine, comprising:

a housing;

a turbine formed within the housing and configured to receive a combustion gas and operable, upon receipt thereof, to supply a first drive force;

a combustor formed within the housing and configured to receive compressed air and fuel and operable, upon receipt thereof, to supply the combustion gas to the turbine; and a centrifugal compressor formed within the housing and configured to supply the compressed air to the combustor, the compressor comprising:

an impeller rotationally mounted within the housing and configured to supply compressed air;

a first diffuser formed within the housing and configured to receive compressed air from the impeller;

a de-swirl section formed within the housing and configured to receive diffused air from the first diffuser and to de-swirl the air;

a second diffuser formed within the housing and coupled to receive the de-swirled air from the de-swirl section, the second diffuser comprising a first wall formed within the housing and a wall formed within the housing, the first and second walls forming a flow passage therebetween; and a plasma actuator disposed proximate the second wall, the plasma actuator adapted to generate an electric field to ionize a portion of air flowing through the flow passage.

16. The gas turbine engine of claim 15, wherein the plasma actuator comprises:

a dielectric component disposed at least partially proximate the second wall, the dielectric component having a first side and a second side;

a first electrode disposed on the first side of the dielectric component; and a second electrode disposed on the second side of the dielectric component.

17. The gas turbine engine of claim 16, wherein:

the second wall includes a cutout formed therein, and the dielectric component is disposed in the cutout.

18. The gas turbine engine of claim 16, wherein:

the dielectric component is coupled to the second wall.

19. The gas turbine engine of claim 15, wherein:

the de-swirl section comprises a third wall and a fourth wall forming a de-swirl flow passage therebetween for the air to flow therethrough to the diffuser;

wherein:

the first electrode is disposed proximate or within the fourth wall; and the second electrode is disposed proximate or within the second wall.

20. The gas turbine engine of claim 19, wherein the compressor further comprises:

a second plasma actuator disposed at least partially proximate the first wall and the third wall, the second plasma actuator comprising:

a second dielectric component disposed at least partially proximate the first wall, the dielectric component having a first side and a second side;

a third electrode disposed on the first side of the dielectric component proximate the third wall; and a second electrode disposed on the second side of the dielectric component proximate the first wall.

* * * * *